May 14, 1968   A. E. UNZICKER ET AL   3,383,238
METHOD AND APPARATUS OF CONTROLLING THIN FILM
DEPOSITION IN A VACUUM
Filed May 27, 1965
FIG. I
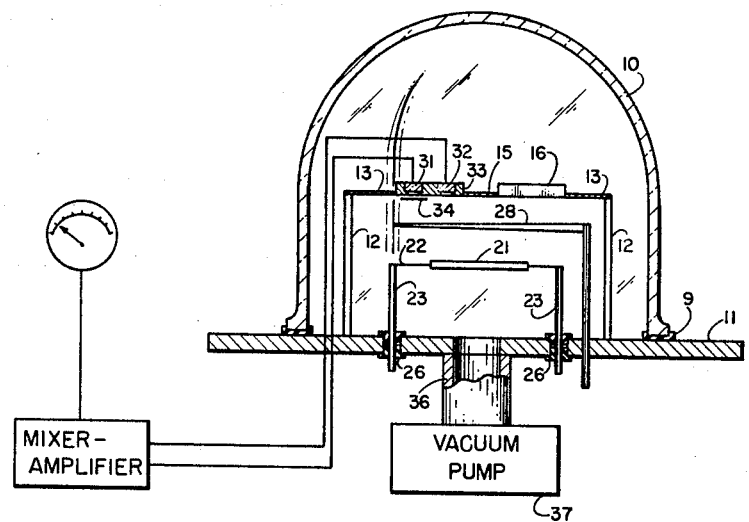
FIG. 3
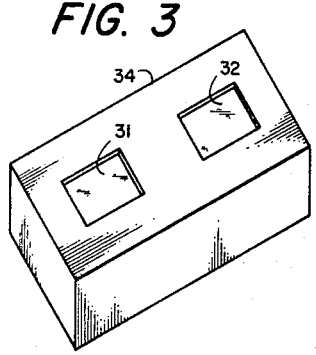
FIG. 2
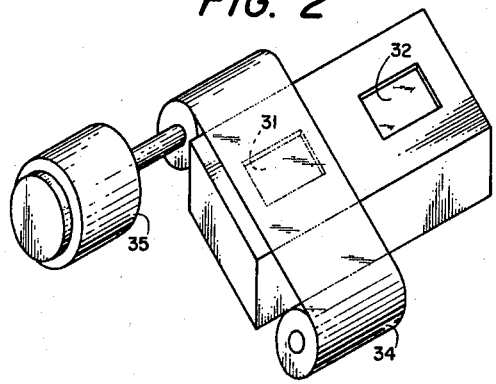
INVENTOR
ARLYN E. UNZICKER
BLAIR J. ZAJAC
BY *Melvin L. Crane* AGENT
         *[signature]* ATTORNEY ated May 14, 1968

3,383,238
METHOD AND APPARATUS OF CONTROLLING THIN FILM DEPOSITION IN A VACUUM
Arlyn Eugene Unzicker, 2204 Woodberry Lane, Falls Church, Va. 22042, and Blair J. Zajac, 1818 Metzerott Road, Apt. 18, Adelphi, Md. 20783
Filed May 27, 1965, Ser. No. 459,481
14 Claims. (Cl. 117—106)

The invention described herein may be manufactured and used by or for the Government of the United States of America for governmental purposes without the payment of any royalties therein or therefore.

The present invention is directed to apparatus and method of vacuum evaporation of materials onto a surface and more particularly directed to apparatus and method of accurately controlling the amount of material deposited onto a surface.

Heretofore various systems have been used to control the thickness or amount of material deposited onto a surface. One such system includes weighing the substrate before and after evaporation to determine by weight the amount of material deposited, thus one determines from hind sight the thickness of a film. Other systems include methods which determine a change in dielectric constant as a function of material thickness, optical interference, optical transmission resistivity, as well as the other types. These systems have their drawbacks wherein the amount of material deposited or thickness of the deposited film are not determined accurate enough for some devices.

The present invention makes use of a system including a pair of quartz crystals, barium titinate, or other similar crystals that will vibrate mechanically when subjected to heat and/or oscillatory electrical potentials. For a given material, its natural resonant frequency is primarily dependent upon its physical volume and geometrical configuration, thus small mass changes upon the crystal surface will be seen as linear perturbations upon the resonant frequency. One crystal is covered to prevent the crystal from becoming coated by the evaporated material while the other crystal becomes coated along with the substrate. The outputs from the two crystals are mixed together and the difference is measured as the one crystal becomes coated. The frequency of the coated crystal changes and the amount of change in the difference frequency is proportional to the mass of the material deposited onto the crystal. Thus the amount of material deposited onto the substrate can be determined.

It is therefore an object of the present invention to provide a system by which the amount of material coated onto a substrate can be accurately controlled and determined.

Another object is to provide a system with which one or more layers of different materials of accurately determined thinness may be deposited onto a substrate without breaking vacuum.

Still another object is to provide a method of accurately controlling the thickness of one or more layers of material deposited onto a substrate.

Yet another object is to provide a system in which the reference control system is subjected to the same ambient conditions as the substrate to be coated.

Other objects, advantages and features of the invention should become apparent from the following detailed description which is taken in conjunction with the accompanying drawing in which:

FIGURE 1 illustrates a cross sectional view of the apparatus suitable for carrying out the invention; and FIGURES 2 and 3 illustrate different means for covering one of the crystals.

Now referring to the drawings, there is shown by illustration a cross sectional view of a system suitable for vacuum evaporation of a material onto a substrate and for determining and controlling the thickness of a film or coating applied to the surface of the substrate. In carrying out the invention, a suitable vacuum chamber 10 is shown in the form of a conventional bell jar type having a supporting platform 11 such as a flat smooth finished plate of cold rolled steel of a thickness to withstand the applied vacuum which serves as the bottom enclosure for the bell. The bottom is sealed by a gasket 9 of any suitable material such as rubber, and mounted on the platform 11 is a pair of uprights 12 having an inturned arm 13. The end portion of the arm provides means upon which a holder 15 may be mounted in order to hold a substrate 16 to be coated in a position to receive the vaporized material on the bottom face thereof. The uprights 12 and holder 15 may be made of stainless steel and the bell may be made of any suitable material which will withstand high vacuum pressure, preferably, glass because of the visibility which glass affords.

The material to be coated onto the substrate is shown at 21 in the form of a coating on a tungsten filament 22 (shown for illustrative purposes only since many other means may be used for vaporizing a desired material). The tungsten filament is supported in the vacuum vessel under the substrate holder by means of a pair of electrodes 23 which may be of any suitable construction with insulators 26 interposed to insulate the electrode assembly from the platform 11 through which the electrodes pass. A plate 27 attached to each of the electrodes at their inner end by any suitable means is provided with a binding post to which the tungsten filament 22 carrying the material coating is attached. In the event a plurality of layers of coatings or film are to be applied to the substrate, more such filaments or other arrangements may be such that each separate material could be coated onto the substrate as desired. Such arrangements are old in the art and within the skill of one in the art. A shutter 28 is placed between the filament and the substrate holder to block passage of vapors until desired by rotation of the shutter from between the filament and the substrate.

The assembly is provided with means for controlling the thickness of each film or coating evaporated onto the substrate. Likewise the means may be used to determine the thickness of the film applied to the substrate and the operation terminated upon reaching a desired coating thickness. Two crystals, a reference crystal 31 and a pick-up crystal 32, are mounted side-by-side in a single holder 33 with one surface of each crystal similarly exposed to the open. The crystal holder is mounted in alignment with or beside the substrate to be coated with the exposed surfaces of the crystals on the same plane as the surface of the substrate to be coated, with the exposed faces of the crystals facing the material to be evaporated. The crystals are electrically connected to a frequency mixer-amplifier which is in turn connected to a frequency counter or meter or both. The electrical wires to each of the crystals are passed through the platform 11 through suitable vacuum seals by use of a twin coaxial cable or any other suitable means. The reference crystal is shielded by a material which will transmit the maximum amount of radiation corresponding to the temperature at which evaporation takes place, since the natural resonance frequency of such crystals changes with temperature. The particular shield material will differ with the suitable temperature for evaporation of a desired material. The important feature is that the shield material transmit maximum radiation so that the radiation environment of the reference and pick-up crystals is substantially the same. Thus, the drift rate of the two crystals will be substantially the same and balanced out in the mixer-amplifier circuit.

Suitable shield material may be formed from a thin plastic, glass, semiconductor material, a filter sandwich (which may enclose a liquid or a gas) or any other material having high transmission in the working wavelength range.

It has been determined that Mylar has a good radiation transmission over a wide range therefore for illustrative purposes the present system will be described with reference to Myla as the shield material recognizing that many other shield materials may be used. The reference crystal is shielded with a Mylar film 34 having a thickness of about $2.5 \times 10^{-4}$ inches which will transmit the maximum amount of radiation generated by the vaporizing means and yet the Mylar will block the vapors of the coating material. Such a crystal shielding film may be supplied in a small roll and wound by a motor 35 as shown in FIG. 2 such that after one coating run, the Mylar film may be advanced by the motor to provide a clean uncoated area of Mylar over the reference crystal for a subsequent run. Such a feature will permit vacuum coating of different materials onto different substrates or the same substrate without breaking vacuum. However, if the same substrate is to be coated with multi-layers without breaking vacuum it will be advantageous to keep the same shield over the reference crystal for all such coatings, since the radiation reflectivity of the different materials deposited onto the pickup crystal will change the radiative loading that the pickup crystal has. Therefore the layers coated onto the Mylar shielding the reference crystal will be the same as the coatings on the pickup crystal wherein the coating on the Mylar will have approximately the same effect on the reference crystal as on the pickup crystal. Where the vacuum will be broken after a single coating, the Maylar film could be secured over the reference crystal as shown in FIG. 3 and changed after the single coating run. The important feature is that the reference crystal be covered by a covering which will satisfy maximum radiation transmission for a given temperature such that both of the crystals are exposed to the same thermal environment during the out-gassing and evaporation period. The chamber is evacuated through a tubular member 36 in the platform 11 by use of any suitable vacuum pump means 37.

In operation of the system for coating a substrate, the crystal assembly and substrate are mounted onto the holder and secured to the uprights 12 with the exposed surface of the reference crystal covered by a maximum radiation transmitting material of any suitable type such as Mylar. The material to be evaporated is placed on the filament or any other evaporation means and secured to the electrodes below the substrate and crystal assembly holder. The bell jar is assembled and evacuated by the vacuum pump and the shutter is rotated to a position directly between the filament and the substrate-crystal assembly holder. To prevent unnecessary high pressures during actual evaporation, the filament is heated raising the coating material temperature to about its melting point to allow thorough out-gassing. The coating material is raised to the evaporation point and the shutter is rotated to a position from between the filament and the substrate-crystal assembly. During the heating period for out-gassing, the electrical power to the crystals, mixer, and amplifier are made operational and the frequencies of the reference crystal and the pick-up crystal are beat together and the difference is measured which frequency difference is called the "zero frequency." The radiation incident on the reference and pick-up crystal due to scattering, etc., will be substantially the same due to maximum transmission by the Mylar film. Thus, any affects on the crystals due to radiation will be approximately the same in each of the crystals prior to evaporation of the films as well as during evaporation. Opening of the shutter permits the evaporated material to be simultaneously deposited onto the bottom surface of the substrate, onto the exposed surface of the pick-up crystal, and onto the shield (Mylar film) covering the reference crystal. The thickness of the film deposited onto the substrate is determined by the thickness of the film deposited onto the pick-up crystal which is equal to the film deposited onto the substrate.

Since the pick-up crystal will oscillate at frequency determined primarily by its physical dimensions, the material deposited onto the pick-up crystal will change its frequency of oscillation. Due to the fact that the exposed surface of the reference crystal is covered by a Mylar film the frequency of the reference crystal will not change. Thus, the frequencies from each of the crystals will be directed to the frequency mixer and the beat frequency will be amplified and directed to the counter or frequency indicator. A specific pre-determined difference indication will determine the exact thickness of the deposited coating and upon reaching the desired thickness according to the desired reading, the shutter is rotated to a position between the heat filament and the substrate-crystal assembly to prevent further deposition of material onto the surface of the substrate. The system is then turned off and cooled down. For multilayer deposition, the Mylar film may be advanced until an uncoated section of the Mylar film covers the reference crystal and other layers may be deposited in succession as set forth above.

It has been determined that several layers deposited onto the pick-up crystal will make it oscillate out of the range of desired operation. Therefore, just prior to reaching a coating thickness that makes the pick-up crystal operate in the non-desired range, the crystal assembly may be rotated such that the crystal positions are interchanged with the previously coated crystal being covered with Mylar and acting as the reference crystal, and the previously non-coated crystal acting as the pick-up crystal. Thus, the crystal assembly has double life. After each of the crystals have been coated to their maximum operational thickness, the crystals may be cleaned by removing the coated layers, evaporating a new conducting material on its surfaces to allow proper operation and reused.

The system may be operated automatically by using the indicator meter as a cut-off switch. As such, the indicator meter may be provided with a cut-off switch which may be set at the desired setting representing the desired film thickness and when the meter reaches the desired setting the electrical circuitry is disconnected to the entire system. Thus, the meter will inactivate the control system thereby controlling the thickness of the film evaporated onto the substrate.

The system of this invention enables one to apply a coating onto a substrate of any desired thickness. This is brought about by the arrangement of the reference and pick-up crystals each of which are affected in the same manner by the radiative environment and other characteristics of the vacuum system.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A method of controlling the thickness of a coating applied to a substrate by vacuum evaporation within a vacuum chamber which comprises:
    positioning a reference crystal and a pick-up crystal relative to a substrate surface to be coated with one face of each crystal in the same plane as the substrate surface and facing the materials to be vaporized,
    covering the reference crystal with a thin infrared radiation transmissive material, and
    detecting and indicating the frequency output difference between the frequency outputs of said reference crystal and said pick-up crystal as said pick-up crystal is coated simultaneously with the substrate surface during evaporation of the coating material whereby the thickness of the coating is determined by the frequency output difference of said crystals indicated.

2. The method as claimed in claim 1 wherein:
said reference crystal is covered with Mylar having a thickness that will readily transmit infrared radiation.

3. A method of controlling the thickness of a coating applied to a substrate by vacuum evaporation within a vacuum chamber which comprises:
mounting a reference crystal and pick-up crystal on the same plane with a substrate to be coated within a vacuum chamber,
covering the reference crystal with a thin sheet of plastic,
preparing a heater within said chamber with a material to be evaporated,
evacuating said chamber,
comparing the frequency output of said reference crystal with said pick-up crystal to set a frequency difference indicator at zero,
positioning a shutter between the substrate to be coated and the heater,
heating said material to be evaporated to its vaporation point to outgas said chamber,
moving said shutter from between the substrate-crystals and the material to be evaporated,
raising the heat above the evaporation point of the material to be evacuated,
determining the thickness of the vapor coating applied to said pick-up crystal by detecting the difference in the frequency output of said crystals whereby said coating applied to said substrate is equal to the coating applied to said pick-up crystal,
placing the shutter between said heater vaporized material and said substrate upon reaching the correct film thickness as indicated by said frequency difference detector, and
inactivating the heater means and after cooling to about room temperature, removing the coated substrate from said chamber.

4. In an apparatus for vapor depositing material onto a substrate and accurately controlling the thickness of the material coating deposited onto said substrate, the combination comprising:
means forming an evacuatable enclosure,
a first support means within said enclosure for holding an evaporating material,
a second support means disposed within said enclosure relative to said first support means,
a substrate supported by said second support means,
a crystal holder,
a reference crystal and a pick-up crystal enclosed by said crystal holder,
separate apertures in the same surface of said crystal holder opening to each of said crystals enclosed therein,
said crystal holder adapted to be supported by said second support means with the surface including the apertures therein facing said first support means with the crystal faces adjacent the apertures in the crystal holder lying in the same plane as the surface of the substrate to be coated, and
a film of plastic covering the aperture in said crystal holder opening to said reference crystal to prevent coating of said reference crystal during vapor coating of said substrate whereby said pick-up crystal will produce a different frequency output depending on the thickness of the film deposited onto said pick-up crystal.

5. An apparatus as claimed in claim 4 which includes:
a detector means for detecting frequency output differences between said reference crystal and said pick-up crystal whereby the frequency difference indicates the thickness of the film evaporated simultaneously onto said pick-up crystal and said substrate surface.

6. In an apparatus as claimed in claim 5 wherein:
said plastic film is Mylar.

7. In an apparatus as claimed in claim 6 wherein:
said Mylar film has a thickness of about $2.5 \times 10^{-4}$ inches.

8. In an apparatus as claimed in claim 5 wherein:
said plastic film is secured about said crystal holder over the aperture to said reference crystal.

9. In an apparatus as claimed in claim 5 wherein:
said plastic film covering said aperture to said reference crystal is continuous and advanced by a motor to provide a clean portion subsequent to application of a film onto said substrate thereby permitting application of a plurality of films onto said substrate during one evacuation of said enclosure prior to cooling and breaking vacuum.

10. A crystal detector usable in a high vacuum chamber for determining the thickness of a film evaporated onto a substrate which comprises:
a crystal holder,
a reference crystal,
a pick-up crystal,
said reference crystal and said pick-up crystal mounted on the same plane in said holder,
separate apertures in the same face of said crystal holder opening to the adjacent face of each of said crystals, and
a vapor shield secured over the aperture in said crystal holder open to said reference crystal thereby covering said reference crystal, wherein:
said vapor shield is formed of a material having maximum radiation transmission corresponding to the temperature required for vaporizing a material to be evaporated onto a substrate.

11. A crystal detector as claimed in claim 10 wherein:
said vapor shield is formed of a material that transmits approximately the same amount of radiation to said reference crystal as that incident on said pick-up crystal.

12. A crystal detector usable in a high vacuum chamber for determining the thickness of a film evaporated onto a substrate which comprises:
a crystal holder,
a reference crystal,
a pick-up crystal,
said reference crystal and said pick-up crystal mounted on the same plane in said holder,
separate apertures in the same face of said crystal holder opening to the adjacent face of each of said crystals, and
a thin plastic film secured over the aperture in said crystal holder open to said reference crystal thereby covering said reference crystal.

13. A crystal detector as claimed in claim 12 wherein:
said thin plastic film is Mylar having a thickness of about $2.5 \times 10^{-4}$ inches.

14. A crystal detector as claimed in claim 13 wherein:
each of said crystals are of a type that vibrates mechanically when subjected to an electrical potential depending upon the physical volume of said crystals.

References Cited

UNITED STATES PATENTS

| 2,906,235 | 9/1959 | Hirsh | 118—9 |
| 3,277,952 | 10/1966 | Proebster et al. | 324—79 |
| 3,266,291 | 8/1966 | King | 73—23 |

ALFRED L. LEAVITT, *Primary Examiner.*

A. GOLIAN, *Assistant Examiner.*